Patented May 24, 1932

1,860,134

UNITED STATES PATENT OFFICE

ROGER B. BROWN, OF TRENTON, NEW JERSEY, ASSIGNOR TO DANIEL MANSON SUTHERLAND, JR., OF MORRISVILLE, PENNSYLVANIA

FIREPROOF FIBER PRODUCT

No Drawing.     Application filed September 10, 1930. Serial No. 481,069.

My invention relates to fire-proofing for woody and fibrous materials, including artificial fiber products such as thermal insulation board and electrical insulation board made of woody fiber, etc., as well as ordinary natural wood lumber and the like. For convenience, I have hereinafter referred broadly to all such materials as "wood". I aim to give such material good resistance to burning and other desirable properties, and to provide for the manufacture of artificial fiber products of this character in a simple and inexpensive manner. The invention is applicable to fiber products containing inflammable substances such as asphalts, resins, gums, etc., and I have hereinafter explained it with special reference to artificial fiber board of this character.

Many agents and methods for rendering vegetable materials uninflammable have been proposed or used, including such substances as ammonium sulphate, boric acid and some of its salts, calcium carbonate, etc., and certain organic chemicals, such as chlorinated naphthalene. These substances are objectionable in various ways, however: e. g., they are water soluble, so as to be readily dissolved out when the fiber is exposed to water; or they are hygroscopic, so that materials treated with them absorb water and are always damp; or they add to the weight of the product unduly; or they are too expensive to be commercially practicable,—as is especially the case with chlorinated naphthalene,—or they have a strong corrosive action on machinery that may be used in the manufacture of the fire-proofed product, or on the means employed to hold or secure the finished product in use. In general, also, the use of such materials involves special processes of impregnation, with pressure or vacuum, and subsequent drying,—all of which tends to increase the cost.

I have found that borates which are water-insoluble and stable or inert toward water—not hydrolyzing materially even in the presence of large amounts of water—are free from the drawbacks of the materials heretofore used. These include insoluble borates that are definitely alkaline in reaction, and especially the alkaline earth borates,—of magnesium, calcium, strontium, and borium,—as well as the borates of copper and manganese. A calcium borate, and particularly calcium meta-borate, $Ca(BO_2)_2$, has been found to give excellent results. All these borates can be introduced into natural wood by known impregnation methods. In addition, they can be incorporated in artificial fiber board very readily and inexpensively, without the difficulties of impregnation processes. Not only does the borate render wood fiber fire-resistant, but it also greatly reduces the inflammability of asphalts, resins, gums, and the like which are used for waterproofing purposes.

Calcium meta-borate is distinctly alkaline in reaction, and non-corrosive; non-hygroscopic; uninflammable and fire-resistant, merely melting or softening to a rather stiff plasticity at the temperature of a flame, relatively insoluble in water; so that it will not wash out of fibrous material fire-proofed with it; and can be precipitated from solution in a flocculent, non-crystalline, bulky form, giving it increased covering power for the fibers with which it is associated, without material effect on the density and weight of the product.

Calcium meta-borate can be formed by the interaction of a solution of a water-soluble calcium salt with a solution of a water-soluble meta-borate, using equivalent amounts of the two solutions:

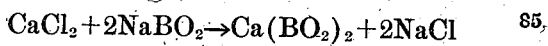
$$CaCl_2 + 2NaBO_2 \rightarrow Ca(BO_2)_2 + 2NaCl$$

Sodium meta-borate, $NaBO_2$, is readily formed from sodium tetra-borate, $Na_2B_4O_7$, by the action of caustic soda in solution:

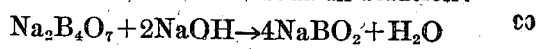
$$Na_2B_4O_7 + 2NaOH \rightarrow 4NaBO_2 + H_2O$$

Or calcium meta-borate can be made from borax, caustic soda, and calcium chloride (for example) according to the following consolidated equation:

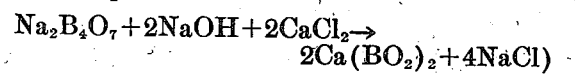
$$Na_2B_4O_7 + 2NaOH + 2CaCl_2 \rightarrow 2Ca(BO_2)_2 + 4NaCl$$

In practice, fiber board is made from fiber pulp, consisting of wood fiber mixed and suspended in a large volume of water. The pulp is brought into a layer of proper thickness, which is partly freed of its water and then dried, either with or without pressure. In making fire-proof board according to my preferred process, I include in the pulp, or add to it, calcium meta-borate, $Ca(BO_2)_2$, as well as a waterproofing agent or material, if it is desired that the final product be waterproof as well as fireproof. As a waterproofing agent may be used any substance or material having this property that can be incorporated with the pulp so as to be properly distributed in the fiber board, such as water-soluble rosin size, rosin-wax size, or wax size. Many such materials commonly known as waterproofing agents can be incorporated in fiber pulp to waterproof the board made therefrom. The fireproofing and waterproofing agents thus incorporated with the pulp are used in such quantity or form that when the water of the pulp is removed, a sufficient amount of the materials in question will remain interspersed amongst the fibers in the board. In other words, the interstices amongst the interlaced fibers are charged or even filled with the waterproofing and fireproofing materials, which are combined or intermixed with one another more or less uniformly, and the fibers are in either case coated with these materials and cemented together by them.

In general, it is better not to form the calcium meta-borate in the pulp itself by reactions such as above indicated, on account of the consequent presence of other salts in the final product in appreciable quantity,—such as sodium chloride, which is objectionable because of its solubility in water, its crystalline character, etc. On the contrary, I prefer to perform the reaction that produces the calcium meta-borate separately, in a rather concentrated solution, and to separate the precipitate from the mother liquor, which carries the sodium chloride or the like in solution, by centrifuging or the like.

The thus purified precipitate may be added to the pulp either mixed and suspended in a small amount of water, in which the rosin size or the like may be dissolved, or in its dry, powdery state, and thoroughly mixed in. With rosin size for waterproofing, the following formula may be used:

| | Lbs. |
|---|---|
| Fiber | 1,000 |
| Rosin size (bone-dry basis) | 20 |
| Calcium meta-borate, $Ca(BO_2)_2$ | 50 |
| Water, previously saturated with calcium meta-borate, about | 50,000 |

This gives about 5% by weight of the fireproofing ingredient in the finished board. However, wide variation of this is permissible: i. e., as little as 2% or less of the waterproofing ingredients in the board will produce a degree of fire resistance that may suffice for some purposes, while for other purposes as much as 25% or more may be desirable. For thermal insulation board of waste wood, 5% of the borate (by weight) in the finished board gives a desirable degree of fire or flame resistance at an economical cost; while for electrical insulation board to be used for switch bases, for example, as much as 15 to 20% of the borate (by weight) in the finished board may be necessary to enable it to meet the underwriters' requirements. To a degree, of course, the amount of fireproofing ingredient required depends on the amount of highly inflammable waterproofing ingredients present. The foregoing discussion presupposed not over 1 to 5% of such waterproofing (e. g., rosin size) in the board, which is generally ample.

After the calcium meta-borate and the rosin size have been added to the pulp and thoroughly stirred in, the pulp is run into a pressing mold ("wet machine") with provisions for draining off the water, or otherwise formed into a "raw" pulp sheet freed of most of the water. This raw sheet may then be pressed between heated drier plates, and thus converted into strong, coherent, waterproof and fireproof board, consisting of the interlaced and compressed fibers and the rosin (not resoluble in water), which cements the fibers together and more or less fills their interstices—along with the calcium meta-borate. The insoluble particles of the metal-borate are dispersed in the rosin and embedded therein, besides clinging to the fiber particles as a coating.

Wood has heretofore been fire-proofed by "secondary" impregnation with various substances, and it has been proposed to treat fiber board in the same way. Such impregnation, however, is subject to serious practical drawbacks:

(1) Only liquids or reagents in solution can be introduced into the pores of the material in this way. Water-soluble reagents, however, are easily washed or soaked out of the board.

(2) To impregnate a board with an insoluble material, a two-step process is necessary: i. e., the board must first be impregnated with a solution of one reagent, and then with a solution of another reagent, which will react with the first to precipitate the desired insoluble material in the pores of the board.

(3) The pores can never be completely filled with any solid introduced in solution,—whether by a one-stage or two-stage process, since the solvent water has to be driven out.

(4) It is difficult or impossible to effectively fire-proof an already thoroughly waterproofed board by impregnation, since its pores are already filled or clogged with the waterproof material.

All of these difficulties and disadvantages of secondary impregnation are overcome by incorporating the fireproofing and waterproofing agents or materials in the pulp, as described above; indeed, no special operation whatever is really required, since the pulp is always thoroughly stirred or agitated before formation into a sheet, as a matter of ordinary manufacturing practice.

Having thus described my invention, I claim:

1. Wood fireproofed with a water-insoluble nonhydrolyzing borate interspersed amongst its fibers.

2. Fiber board comprising interlaced fibers having their interstices charged with a waterproofing material, and particles of a water-insoluble nonhydrolyzing borate embedded therein.

3. Wood fireproofed with calcium meta-borate interspersed amongst its fibers.

4. Fiber board containing from 2% to 25% of calcium meta-borate interspersed amongst its fibers.

In testimony whereof, I have hereunto signed my name at Trenton, New Jersey, this 4th day of September, 1930.

ROGER B. BROWN.